Oct. 13, 1925.

F. SERGARDI

SPRING SHACKLE

Filed March 14, 1924

1,557,219

Inventor
Fabio Sergardi
By Spencer Sewall & Hardman
his Attorneys

Patented Oct. 13, 1925.

1,557,219

UNITED STATES PATENT OFFICE.

FABIO SERGARDI, OF DAYTON, OHIO, ASSIGNOR TO GENERAL MOTORS RESEARCH CORPORATION, OF DAYTON, OHIO, A CORPORATION OF OHIO.

SPRING SHACKLE.

Application filed March 14, 1924. Serial No. 699,187.

*To all whom it may concern:*

Be it known that I, FABIO SERGARDI, a subject of the King of Italy, residing at Dayton, county of Montgomery, and State of Ohio, have invented certain new and useful Improvements in Spring Shackles, of which the following is a full, clear, and exact description.

This invention relates to shackles, and more particularly to shackles for connecting the ends of leaf springs of vehicles to the frame or to each other.

The chief object of the invention is to prevent looseness between the spring eye or other member connected to the vehicle by automatically compensating for wear between the side links of the shackles and the spring eyes or other parts engaged by them.

This object is attained by means of an elastic member intermediate the cross connections or pins of the shackle so disposed as to press the links toward each other and thus automatically take up wear between the links and the spring eye or other part connected with the cross pins.

Exemplary embodiments of the invention are shown in the accompanying drawings in which.

Figure 1:
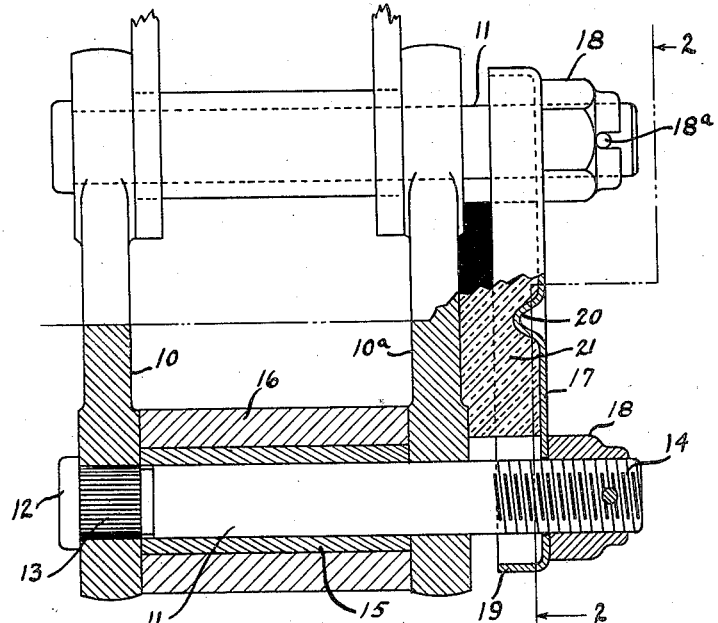
Fig. 1 is a front elevation partly in section of a preferred form.
Figure 2:
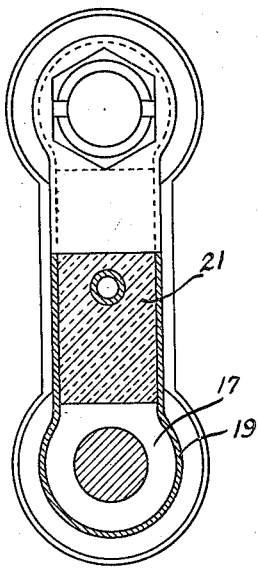
Fig. 2 is a section on line 2—2 of Fig. 1.

In Fig. 1 numerals 10 and 10$^a$ indicate side links of a shackle. These links may be drop forged from mild steel or otherwise formed from any suitable material. The links 10 and 10$^a$ are preferably of similar shape, each link having its opposite ends perforated. Cross connecting members, consisting of pins 11, connect the opposite ends of the side links. These connecting members are preferably formed separate from the side link 10 but are rigidly connected thereto. As shown in Fig. 1 each pin is provided with a head 12, a knurled neck 13 adjacent the head, a smooth bearing body and threaded ends 14. The pins in the form shown are connected to the link 10 by setting the knurled portion 13 with a driving fit in holes formed in said link. By making the connecting members 11 separate from the link 10 harder steel may be used for said connecting members than for the links if desired.

Surrounding the smooth body of the pins 11 there is preferably a bushing 15 as of bronze. Bearing upon the bushing is the eye 16 of a spring or other member connected to the shackle.

The connections at the other end of the shackle may be a duplicate of that just described or it may be modified slightly in order to adapt it to the particular frame or connection with which it is to be used. In the form shown the link 10$^a$ is free to move toward and from the link 10, as permitted by the associated parts, so that said links may be caused to approach each other to take up for wear on the ends of the eye member 16 and bushing 15.

An abutment 17 bridges the space between the pins 11. This bridging abutment in the form shown in the drawings, has its end perforated so as to admit the pins 11. Castellated nuts 18, screwed on the threaded ends of the pins 11, prevent movement of said abutment away from the link 10$^a$. Pins 18$^a$ may be used for locking the nuts in the desired adjustment.

The abutment shown in Fig. 1 may be stamped from sheet metal and be provided with a flange at 19 extending around its edge and with an embossed projection 20 protruding into the space confined by said flange. Seated between opposite sides of the flange 19 and penetrated by the embossed portion 20 is a block of rubber or other suitable elastic material 21. This block is preferably elongated so that each end extends to within a relatively short distance of the pins 11. The block 21 is confined from lateral movement by opposite portions of the surrounding flange 19 and from longitudinal movement by the projecting embossed portion 20 which penetrates the rubber block. The flange 19 stiffens the abutment 17 as well as serving as a means for confining the rubber block.

Figures 3, 4:
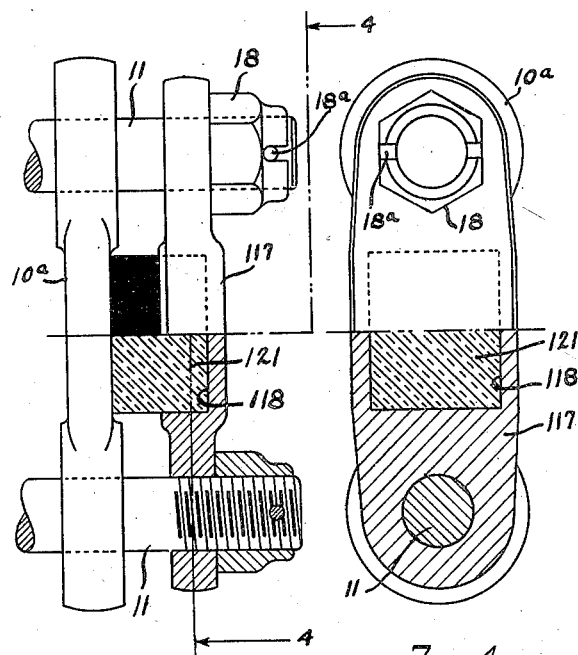
Fig. 3 is a fragmentary view partly in section of a modified form viewed in the same direction as Fig. 1.
Fig. 4 is a section on line 4—4 of Fig. 3.

In the modification shown in Fig. 3, the bridging abutment 117 instead of being a sheet metal stamping is a drop forged plate or bar having a seat 118 for receiving a rubber block 121.

Figure 5:
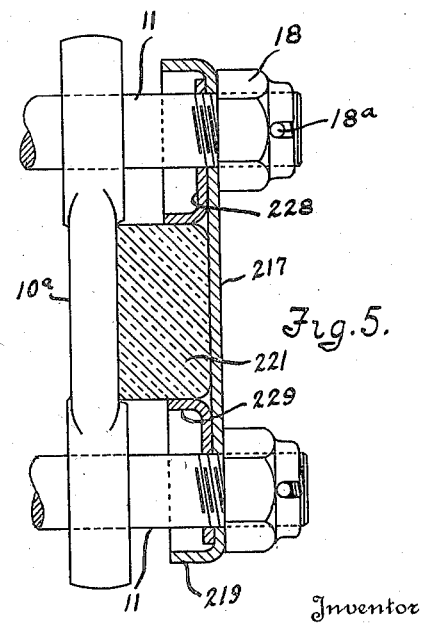
Fig. 5 is a fragmentary view partly in section of a second modification.

The modification shown in Fig. 5 differs from those previously described in the form of bridging abutment. This form of said abutment consists of a stamped sheet metal member 217 having a flange 219. A separate sheet metal member 228 is provided with a central upstanding flange 229 forming a seat for confining the rubber block 221. The seat member 228 may be welded to the stamping 217 and the perforations for receiving the pins 11 may extend through both stampings 227 and 228.

The rubber block or other elastic body may be inserted in position after the assembly of the shackle with the members connected by it, and the nuts 18 may then be set up so as to place the elastic member under compression. When the ends of the spring eye or other member wear, the expansive force of the elastic member will press the link 10$^a$ inward so as to take up the wear and prevent rattling. This construction is easy to assemble, efficient in use and durable.

While the embodiments of the present invention as herein disclosed, constitute preferred forms, it is to be understood that other forms might be adopted, all coming within the scope of the claims which follow.

What I claim and desire to secure by Letters Patent is:

1. A shackle comprising relatively movable side links, cross connections, and an elastic body of rubber disposed intermediate the cross connections in such manner as to force said side links yieldingly toward each other.

2. A shackle comprising two side links capable of relative movement toward or from each other, cross connections comprising bearing pins extending from one side link through the other, an abutment bridging the space between said bearing pins, means adapted to adjust the ends of said abutment with respect to the bearing pins, an elastic body disposed intermediate said bearing pins between said abutment and the adjacent side link so as to force said side links yieldingly toward each other.

3. A shackle comprising side links, cross connections comprising bearing pins threaded at one end, one of said side links having holes through which the threaded ends of said bearing pins project, nuts on the threaded ends of said pins, an abutment the ends of which are engaged by said nuts, and an elastic body disposed between the abutment and the adjacent side link.

4. A shackle comprising side links, cross connections, an abutment bridging the space between said cross connections and engaging them, a block of rubber disposed intermediate the cross connections between said abutment and side links so as to force said side links toward each other.

5. A shackle comprising side links, cross connections, an abutment bridging the space between said cross connections, said abutments and adjacent side link being capable of movement toward and from each other, an elongated mass of rubber intermediate said cross connections disposed between said abutment and adjacent side link and adapted to exert elastic force tending to separate them.

6. A shackle comprising relatively movable side links, cross connections, an abutment engaging said cross connections and bridging the space between them, a block of rubber disposed intermediate the cross connections, between said abutment and a side link so as to force said side links toward each other, said abutment having means adapted to prevent lateral displacement of the block of rubber.

7. A shackle such as is defined in claim 6 in which the bridging abutment consists of a flanged sheet metal member and the block of rubber is confined between opposite portions of said flange intermediate of the cross connections.

8. A shackle such as is defined in claim 6 in which the bridging abutment consists of a flanged sheet metal member having an embossed inward projection and in which the block of rubber is confined between opposite portions of the flange intermediate the cross connections and is penetrated by said projection.

In testimony whereof I hereto affix my signature.

FABIO SERGARDI.